(12) United States Patent
Kimura et al.

(10) Patent No.: US 8,945,698 B2
(45) Date of Patent: Feb. 3, 2015

(54) HONEYCOMB STRUCTURE AND METHOD FOR MANUFACTURING THE SAME

(75) Inventors: Koji Kimura, Nagoya (JP); Takuya Nunome, Nagoya (JP); Shuhei Fujita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 561 days.

(21) Appl. No.: 12/854,379

(22) Filed: Aug. 11, 2010

(65) Prior Publication Data
US 2011/0070396 A1  Mar. 24, 2011

Related U.S. Application Data

(60) Provisional application No. 61/245,317, filed on Sep. 24, 2009.

(51) Int. Cl.
  *B01D 46/24* (2006.01)
  *B28B 11/00* (2006.01)
  *B32B 3/12* (2006.01)
  *C04B 38/00* (2006.01)

(52) U.S. Cl.
  CPC .............. *B28B 11/007* (2013.01); *B32B 3/12* (2013.01); *C04B 38/0006* (2013.01); *B01D 46/2459* (2013.01); *B01D 46/244* (2013.01)
  USPC .............................. 428/116; 55/523; 422/180

(58) Field of Classification Search
  CPC ........... C04B 38/0012; B01D 46/2418; B01D 46/244; B01D 46/2455; B01D 46/2459; F01N 2260/10
  USPC .......... 428/116–118; 422/169–172, 177–180; 55/522–524
  See application file for complete search history.

(56) References Cited

U.S. PATENT DOCUMENTS

| | | | |
|---|---|---|---|
| 2006/0185335 A1 | 8/2006 | Ichikawa | |
| 2006/0216465 A1* | 9/2006 | Kai et al. | 428/116 |
| 2007/0039298 A1 | 2/2007 | Tokumaru | |
| 2007/0240396 A1* | 10/2007 | Mizutani | 55/523 |
| 2008/0155952 A1 | 7/2008 | Okazaki et al. | |

(Continued)

FOREIGN PATENT DOCUMENTS

| | | |
|---|---|---|
| CN | 101534921 | 9/2009 |
| EP | 1 679 109 A1 | 7/2006 |
| JP | 07-332064 A1 | 12/1995 |

(Continued)

OTHER PUBLICATIONS

U.S. Appl. No. 12/854,399, filed Aug. 11, 2010, Kimura et al.

(Continued)

*Primary Examiner* — David Sample
*Assistant Examiner* — Nicholas W Jordan
(74) *Attorney, Agent, or Firm* — Burr & Brown, PLLC

(57) ABSTRACT

A honeycomb structure includes porous partition walls via which a plurality of cells constituting through channels for a fluid are partitioned; and an outer peripheral wall positioned in the outermost periphery of the structure. Open frontal areas of predetermined cells in an end face of the structure on a fluid inlet side thereof and open frontal areas of remaining cells an end face of the structure on a fluid outlet side thereof are provided with plugged portions. Bubbles are formed in the plurality of plugged portions, and the center of each of the bubbles is positioned in a predetermined region of each of the plugged portions along the central axis direction thereof.

8 Claims, 10 Drawing Sheets

(56) References Cited

U.S. PATENT DOCUMENTS

| | | |
|---|---|---|
| 2009/0181167 A1 | 7/2009 | Kimura et al. |
| 2010/0058725 A1 | 3/2010 | Konomi et al. |

FOREIGN PATENT DOCUMENTS

| | | |
|---|---|---|
| JP | 2006-231162 A1 | 9/2006 |
| JP | 2009-040046 A1 | 2/2009 |
| WO | 2006/068256 | 6/2006 |

OTHER PUBLICATIONS

European Search Report (with English Translation) European Application No. 10818647.9, dated Mar. 19, 2013 (8 pages).

* cited by examiner 2 0 0

HONEYCOMB STRUCTURE AND METHOD FOR MANUFACTURING THE SAME

BACKGROUND OF THE INVENTION

1. Field of the Invention

The present invention relates to a honeycomb structure and a method for manufacturing the honeycomb structure, and more particularly, it relates to a honeycomb structure which can suppress deformation, cracking or the like due to a temperature change, and a method for manufacturing the honeycomb structure.

2. Description of the Related Art

There is a rising need to remove fine particles or harmful substances from an exhaust gas of an internal combustion engine, a boiler or the like in consideration of an influence on environment. In particular, regulations on the removal of the fine particles (hereinafter referred to as a particulate matter (PM) sometimes) discharged from a diesel engine tend to be strengthened in Europe, United States and Japan. Moreover, a honeycomb structure is used as a collecting filter for removing such a PM.

Examples of the filter used for such a purpose include a honeycomb filter in which a plugged honeycomb structure is utilized (see, e.g., Patent Documents 1 and 2). Here, the plugged honeycomb structure comprises porous partition walls via which a plurality of cells constituting through channels for a fluid (an exhaust gas, a purified gas) are partitioned, and an outer peripheral wall positioned in the outermost periphery of the structure. Open frontal areas of predetermined cells in the end face of the filter on a fluid (exhaust gas) inlet side thereof and open frontal areas of remaining cells in the end face of the filter on a fluid (purified gas) outlet side thereof have plugged portions. According to such a honeycomb filter, the exhaust gas flows into the cells through the end face of the filter on the exhaust gas inlet side thereof, the exhaust gas which has flowed into the cells passes through the partition walls, and the exhaust gas (the purified gas) passed through the partition walls is discharged through the end face of the filter on the exhaust gas outlet side thereof. Moreover, when the exhaust gas passes through the partition walls, the PM included in the exhaust gas is collected by the partition walls, and the exhaust gas becomes the purified gas.

[Patent Document 1] JP-A-2009-40046
[Patent Document 2] JP-A-2006-231162

SUMMARY OF THE INVENTION

In a conventional honeycomb filter, bubbles having different sizes are formed in plugged portions sometimes. Moreover, the bubbles are formed in different positions of the plugged portions. When the bubbles having different sizes are formed in the plugged portions or the bubbles are formed in the different positions of the plugged portions, a heat capacity, thermal expansion, Young's modulus or the like varies with each plugged portion. Therefore, when a temperature change or the like occurs, a portion on which a stress is concentrated is generated, thereby causing a problem such as deformation or breakage. In particular, the stress is concentrated on the intersecting portions of the partition walls, thereby causing a problem such as the breakage or cracking.

The present invention has been developed in view of such a conventional technology problem, and an object thereof is to provide a honeycomb structure which can suppress cracking, deformation or the like due to a temperature change, and a method for manufacturing the honeycomb structure.

According to the present invention, there are provided a honeycomb structure and a method for manufacturing the honeycomb structure as follows.

[1] A honeycomb structure comprising: porous partition walls via which a plurality of cells constituting through channels for a fluid are partitioned; and an outer peripheral wall positioned in the outermost periphery of the structure, open frontal areas of predetermined cells in an end face of the structure on a fluid inlet side thereof and open frontal areas of remaining cells in an end face of the structure on a fluid outlet side thereof being provided with plugged portions, wherein bubbles are formed in the plurality of plugged portions, and the center of each of the bubbles is positioned in a predetermined region of each of the plugged portions along the central axis direction thereof.

[2] The honeycomb structure according to [1], wherein the average diameter of the bubbles is from 0.5 to 1.6 mm.

[3] The honeycomb structure according to [1] or [2], wherein one or two bubbles are formed in each of the plugged portions.

[4] The honeycomb structure according to any one of [1] to [3], wherein the predetermined region of the plugged portion along the central axis direction thereof where the center of the bubble is positioned is a region between the position of ⅓ of the depth of the plugged portion from the end of the plugged portion on the end face side thereof and the position of ½ of the depth of the plugged portion from the end of the plugged portion on the end face side thereof.

[5] The honeycomb structure according to any one of [1] to [4], wherein the plugged portions of 70% or more of all the plugged portions have the bubbles.

[6] The honeycomb structure according to any one of [1] to [5], wherein the depths of the plugged portions are from 3 to 12 mm.

[7] The honeycomb structure according to any one of [1] to [6], wherein the predetermined cells and the remaining cells are alternately arranged.

[8] The honeycomb structure according to any one of [1] to [7], wherein the bubble is formed in the center region of the plugged portion in a cross section thereof perpendicular to a direction in which the cells extend.

[9] The honeycomb structure according to any one of [1] to [8], wherein the material of the partition walls and the plugged portions contains at least one selected from the group consisting of cordierite, mullite, alumina, silicon carbide and aluminum titanate.

[10] A method for manufacturing a honeycomb structure, comprising: a masking process of attaching a sheet to one end face of a formed honeycomb article comprising porous partition walls via which a plurality of cells constituting through channels for a fluid are partitioned and an outer peripheral wall positioned in the outermost periphery of the article, and making holes in the positions of the sheet superimposed on the cells in which plugged portions are to be formed; a first press-in process of pressing the end of the formed honeycomb article, to which the sheet is attached, into a container in which a plugging material is received, to press the plugging material into the cells via the one end face of the formed honeycomb article through the holes formed in the sheet; a recess portion forming process of recessing the end of the plugging material charged in the formed honeycomb article on the end face side of the formed honeycomb article to form recess portions; and a second press-in process of further pressing the plugging material into the cells in which the plugging material having the formed recess portions, over the plugging material having the formed recess portions.

[11] The method for manufacturing the honeycomb structure according to [10], wherein the second press-in process is a process of moving a pressurization member having a pressurization face along the surface of the sheet in a state where the pressurization face forms an acute angle with respect to the end face of the formed honeycomb article, and pressing, by the pressurization face, the plugging material supplied between the sheet and the pressurization face into the cells in which the plugging material having the formed recess portions is charged, over the plugging material having the formed recess portions, through the holes formed in the sheet.

[12] A manufacturing apparatus of a honeycomb structure, comprising: a first press-in device including a container for plugging in which a plugging material is received, and press-in means for pressing, into the container for plugging in which the plugging material is received, the end of a formed honeycomb article including porous partition walls via which a plurality of cells constituting through channels for a fluid are partitioned and an outer peripheral wall positioned in the outermost periphery of the article, to charge the plugging material into the cells through the end face of the formed honeycomb article; a second press-in device including a pressurization member having a pressurization face to further press, by the pressurization member, the plugging material into the cells over the plugging material charged in the cells of the formed honeycomb article; and a drying device which dries the plugging material charged in the formed honeycomb article.

According to the honeycomb structure of the present invention, the bubbles are formed in the plurality of plugged portions, and the centers of the bubbles are positioned in the predetermined region along the central axis direction of the plugged portions. Therefore, it is possible to decrease the fluctuations of the heat capacity, thermal expansion (coefficient), Young's modulus and the like in each of the plugged portions. When a temperature change or the like occurs, a portion on which a stress is concentrated can be inhibited from being generated, and accordingly, breakage, deformation or the like during the occurrence of the temperature change or the like can be suppressed.

According to the method for manufacturing the honeycomb structure of the present invention, after charging the plugging material into the cells of the formed honeycomb article, the recess portions are formed in the end of the plugging material on the end face side of the article. Afterward, the plugging material is newly charged into the cells over the plugging material having the formed recess portions. In consequence, the bubbles are formed in the plurality of plugged portions so that the centers of the bubbles can be positioned in the predetermined region along the central axis direction of the plugged portions.

DETAILED DESCRIPTION OF THE INVENTION

Hereinafter, a configuration for carrying out the present invention will specifically be described, but it should be understood that the present invention is not limited to the following embodiment, and is appropriately subjected to design change, improvement or the like based on the ordinary knowledge of a person with ordinary skill in the art without departing from the scope of the present invention.

Figure 1A:
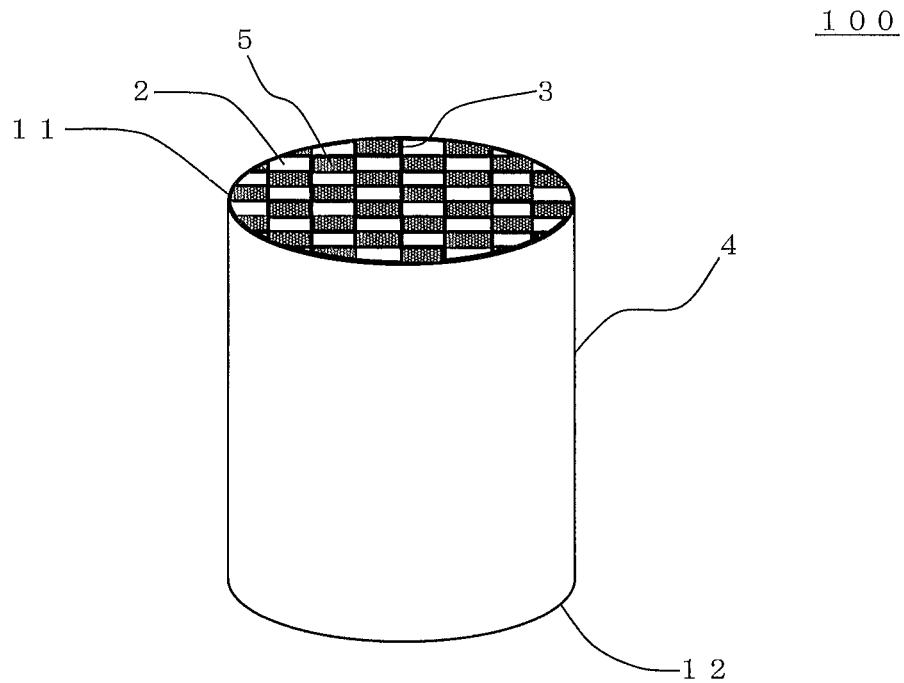
FIG. 1A is a perspective view schematically showing one embodiment of a honeycomb structure of the present invention.
Figure 1B:
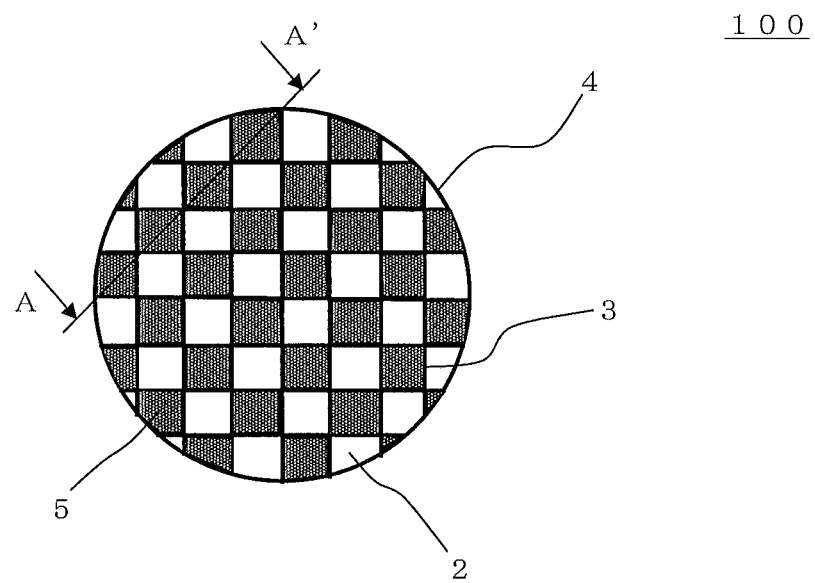
FIG. 1B is a plan view schematically showing the embodiment of the honeycomb structure of the present invention.
Figure 1C:
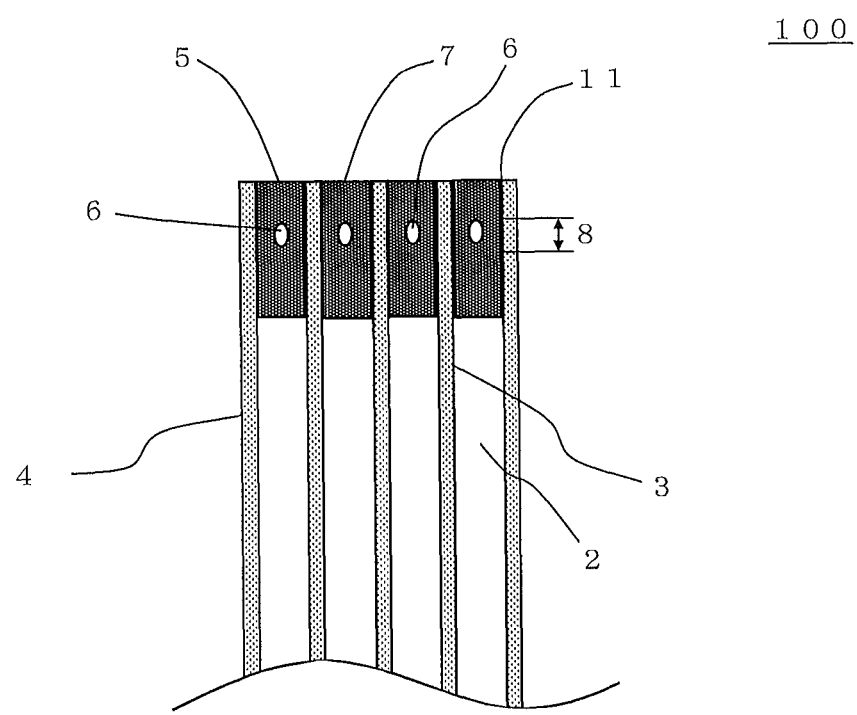
FIG. 1C is a schematic diagram showing a cross section cut along the A-A' line of FIG. 1B.

(1) Honeycomb Structure:

As shown in FIGS. 1A to 1C, one embodiment of a honeycomb structure of the present invention comprises porous partition walls 3 via which a plurality of cells 2 constituting through channels for a fluid are partitioned; and an outer peripheral wall 4 positioned in the outermost periphery of the structure. Open frontal areas of the predetermined cells 2 in an end face 11 of the structure on a fluid inlet side thereof and open frontal areas of the remaining cells 2 in an end face 12 of the structure on a fluid outlet side thereof have plugged portions 5. Bubbles are formed in the plurality of plugged portions, and the center of each of bubbles 6 is positioned in a predetermined region along the central axis direction of each of the plugged portions 5. Here, 'the bubble 6' is a space formed in the plugged portion 5 and having a diameter of 0.3 mm or more. Moreover, 'the center of the bubble 6' is the geometric center of the bubble in 'the cross section of the plugged portion 5 cut along the plane of the plugged portion 5 including a central axis thereof. FIG. 1A is a perspective view schematically showing one embodiment of the honeycomb structure of the present invention. FIG. 1B is a plan view schematically showing the embodiment of the honeycomb structure of the present invention. FIG. 1C is a schematic diagram showing a cross section cut along the A-A' line of FIG. 1B.

Thus, in a honeycomb structure 100 of the present embodiment, the bubbles are formed in the plurality of plugged portions 5, and the center of each of the bubbles 6 is positioned in the predetermined region along the central axis direction of each of the plugged portions 5. Therefore, the fluctuations of the heat capacity, thermal expansion, Young's modulus or the like of each plugged portion can be decreased. When a temperature change or the like is generated, a portion on which a stress is concentrated can be inhibited from being generated. The occurrence of deformation, damage or the like during the generation of the temperature change or the like can be suppressed. In particular, the damage of the intersecting portions of the partition walls or the like can be suppressed. Moreover, the size of the bubble 6 or the like is optimized in accordance with the use environment of the honeycomb structure 100, which can further enhance the effect of suppressing the occurrence of the deformation, damage or the like during the generation of the temperature change or the like.

In the honeycomb structure of the present embodiment, the average diameter of the bubbles 6 is preferably from 0.5 to 1.6 mm, further preferably from 0.6 to 1.2 mm. When the average diameter is smaller than 0.5 mm, the heat capacity of the plugged portions 5 is not easily decreased sometimes. When it is larger than 1.6 mm, the strength of the plugged portions 5 deteriorates sometimes. The average diameter of the bubbles 6 is a value obtained by averaging the diameters of the bubbles 6 formed in 100 plugged portions 5 in 'the cross sections of the plugged portions 5 cut along the planes of the plugged portions 5 including the central axes thereof'. Even when a plurality of bubbles 6 are formed in one plugged portion 5, the diameters of all the bubbles 6 are averaged. The diameters of the bubbles 6 are measured in a state where each bubble is enlarged twice by an optical microscope. 'The diameter of the bubble in the cross section of the plugged portion 5 cut along the plane of the plugged portion 5 including the central axis thereof' is a corresponding diameter calculated from the area of the bubble in the cross section. 'The corresponding diameter calculated from the area of the bubble' is the diameter of 'a circular shape' having an area equal to that of the bubble in the cross section.

Moreover, one or two bubbles 6 are preferably formed in each of the plugged portions. When three or more bubbles 6 are formed, the strength of the plugged portion 5 deteriorates sometimes.

'The predetermined region along the central axis direction of the plugged portion 5' where the center of the bubble 6 is positioned in the plugged portion 5 is preferably a region between 'the position of ⅓ of the depth of the plugged portion 5 from an end 7 of the plugged portion 5 on the end face 11 (the end face 11 of the honeycomb structure 100) side' and 'the position of ½ of the depth of the plugged portion 5 from the end 7 of the plugged portion 5 on the end face 11 (the end face 11 of the honeycomb structure 100) side'. When the bubble 6 is formed in a position closer to the end 7 than to 'the position of ⅓ of the depth of the plugged portion 5 from the end 7 of the plugged portion 5 on the end face 11 side', the strength around the end 7 of the plugged portion 5 deteriorates sometimes. When the bubble 6 is formed in a position farther from the end 7 than from 'the position of ½ of the depth of the plugged portion 5 from the end 7 of the plugged portion 5 on the end face 11 side', the strength around the ends of the plugged portions 5 facing the space sides of the cells 2 (the ends of the plugged portions facing the inside of the honeycomb structure 100) deteriorates sometimes. Here, 'the predetermined region along the central axis direction of the plugged portion 5' means the predetermined region of the plugged portion 5 in 'the central axis direction of the plugged portion 5'. Moreover, as described above, in the case of the plugged portion 5 formed on the end face 11 side of the honeycomb structure 100 on the inlet side thereof, the predetermined region of the plugged portion 5 along the central axis direction thereof is defined on the basis of 'the end 7 of the plugged portion 5 on the end face 11 side of the honeycomb structure 100 on the inlet side thereof'. However, in the case of the plugged portion 5 formed on the end face 12 side of the honeycomb structure on the outlet side thereof, the predetermined region is defined on the basis of 'the end of the plugged portion 5 on the end face 12 side of the honeycomb structure 100 on the outlet side thereof'.

As to the position of the center of the bubble 6, the plugged portion is cut along 'the plane of the plugged portion including the central axis thereof' to measure a distance (the bubble depth) from the end of the plugged portion 'on the end face side of the formed honeycomb article' to the center of the bubble, thereby obtaining a ratio value of the depth of the bubble with respect to the depth of the plugged portion along the central axis direction thereof. Moreover, when the position of the center of the bubble 6 in each of 100 plugged portions is in 'the predetermined region of the plugged portion 5 along the central axis direction thereof', it is presumed that 'the center of the bubble 6 is positioned in the predetermined region of the plugged portion 5 along the central axis direction thereof'.

Moreover, the bubbles 6 are formed preferably in the plugged portions 5 of 70% or more of all the plugged portions 5, further preferably in the plugged portions 5 of 90% or more, especially preferably in all the plugged portions 5. When the bubble forming ratio is less than 70%, the heat capacity of the plugged portion 5 is increased, and the effect of preventing the deformation, damage or the like due to the temperature change deteriorates sometimes. Here, 'the plugged portions 5 of 70% or more of all the plugged portions 5' are based on the number of the plugged portions 5. In other words, the bubbles 6 are preferably formed in the number of the plugged portions 5 which is 70% or more of the number of all the plugged portions 5. Moreover, needless to say, all the plugged portions 5 mean all the plugged portions in the cross section exposed to be observed.

Moreover, in the honeycomb structure 100 of the present embodiment, the bubble 6 is preferably formed in the center region of the plugged portion 5 in the cross section perpendicular to a direction in which the cells 2 extend. 'The center region of the plugged portion 5' is a region analogous to the plugged portion 5 in the cross section of the plugged portion 5 perpendicular to the extending direction of the cells 2, the area of the region is 50% of the area of the plugged portion 5, and the center of the region is the same position as that of the gravity of the plugged portion 5.

In the honeycomb structure 100 of the present embodiment, the average pore diameter of the partition walls 3 is preferably from 10 to 40 µm, further preferably from 10 to 30 µm. With the average pore diameter smaller than 10 µm, even when a less amount of particulate material is deposited, a pressure loss increases sometimes. When it is larger than 40 µm, the honeycomb structure 100 becomes brittle and easily breaks down sometimes. The average pore diameter of the partition walls 3 is a value measured with a mercury porosimeter.

In the honeycomb structure 100 of the present embodiment, the porosities of the partition walls 3 are preferably from 30 to 70%, further preferably 35 to 60%. When the porosities are smaller than 30%, the pressure loss increases sometimes. When they are larger than 70%, the honeycomb structure 100 becomes brittle and easily breaks down sometimes. The porosities of the partition walls 3 are values measured with the mercury porosimeter.

In the honeycomb structure 100 of the present embodiment, the thicknesses of the partition walls 3 are preferably from 200 to 300 μm, further preferably from 250 to 300 μm. When the thicknesses are smaller than 200 μm, the strength of the honeycomb structure 100 deteriorates sometimes. When they are larger than 300 μm, the pressure loss during the passage of the exhaust gas through the cells increases sometimes.

In the honeycomb structure 100 of the present embodiment, the cell density of the cross section perpendicular to the cell extending direction is preferably from 300 to 400 cells/inch$^2$ (from 46.5 to 62.0 cells/cm$^2$). When the cell density is smaller than 300 cells/inch$^2$, the strength of the honeycomb structure 100 deteriorates sometimes. When it is larger than 400 cells/inch$^2$, the pressure loss increases sometimes.

In the honeycomb structure 100 of the present embodiment, there is not any special restriction on a cell shape, but the cell shape is a polygonal shape such as a triangular, quadrangular, pentangular or hexagonal shape, a circular shape or an elliptic shape, or may be another irregular shape in the cross section perpendicular to the cell extending direction.

In the honeycomb structure 100 of the present embodiment, the material of the partition walls 3 and the plugged portions 5 preferably contains at least one selected from the group consisting of cordierite, mullite, alumina, silicon carbide and aluminum titanate, is further preferably at least one selected from the group consisting of cordierite, mullite, alumina, silicon carbide and aluminum titanate, and is especially preferably one selected from the group consisting of cordierite, mullite, alumina, silicon carbide and aluminum titanate. Moreover, the material of the plugged portions 5 is preferably the same as that of the partition walls 3.

Figure 8:
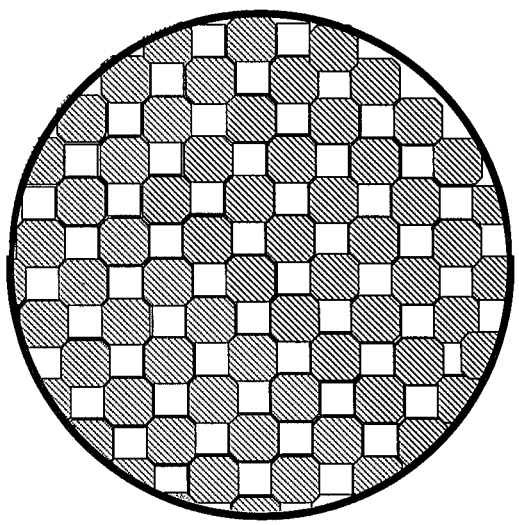
FIG. 8 is a plan view schematically showing another embodiment of the honeycomb structure of the present invention.

There is not any special restriction on the outer shape of the honeycomb structure 100 of the present embodiment, but examples of the outer shape include a cylindrical shape, an elliptic tubular shape, 'a tubular shape with a bottom surface having a polygonal shape, e.g., a square tubular shape or the like', and a tubular shape with a bottom surface having an irregular shape. Moreover, there is not any special restriction on the size of the honeycomb structure 100, but the honeycomb structure is formed so that the ratio of the length of the honeycomb structure in the axial direction with respect to the outer diameter of the honeycomb structure (the length/the outer diameter) is preferably from 0.1 to 0.8, further preferably from 0.1 to 0.6. Furthermore, when the honeycomb structure 100 has another shape, the area of the bottom surface thereof is preferably in the same range as that of the area of the bottom surface of the above cylindrical shape. In addition, in FIG. 1, all the cells have a square shape and an equal size, but as in the shape of a honeycomb structure 200 shown in FIG. 8, the sizes of the adjacent cells of the honeycomb structure may be changed to increase a PM collection capacity.

The honeycomb structure 100 of the present embodiment has the plugged portions 5 in the open frontal areas of the predetermined cells 2 in the end face 11 on the fluid inlet side and the open frontal areas of the remaining cells in the end face 12 on the fluid outlet side. Moreover, the predetermined cells and the remaining cells are preferably alternately arranged so that the plugged portions and 'the open frontal areas of the cells' form checkered patterns in the end face 11 on the inlet side and the end face 12 on the outlet side.

The depths of the plugged portions 5 are preferably from 3 to 12 mm, further preferably from 5 to 10 mm. When the depths are smaller than 3 mm, the strength of the plugged portions 5 deteriorates sometimes. When they are larger than 12 mm, the PM collection areas of the partition walls 3 decrease sometimes. The depth of each of the plugged portions 5 means the length of the plugged portion 5 along the central axis direction thereof (the cell extending direction).

In the honeycomb structure 100 of the present embodiment, the outer peripheral wall positioned in the outermost periphery may be an integrally formed wall formed integrally with the formed honeycomb article during forming, or a cement coat wall formed by grinding the outer periphery of the formed honeycomb article into a predetermined shape after the forming, and making an outer peripheral wall of cement or the like. When the outer peripheral wall is the integrally formed wall, the thickness of the outer peripheral wall is preferably from 0.5 to 1.5 mm. This also applies to a case where the outer peripheral wall is the cement coat wall. Moreover, when the outer peripheral wall is the cement coat wall, examples of the material of the cement coat wall is a material obtained by adding a flux component such as glass to a common raw material.

In the honeycomb structure 100 of the present embodiment, a catalyst for burning and removing the particulate material, a catalyst for removing a harmful substance such as NO$_x$ from the exhaust gas or the like may be loaded on the surfaces of the partition walls 3 in accordance with a use application.

(2) Method for Manufacturing Honeycomb Structure:

Next, one embodiment of the method for manufacturing the honeycomb structure of the present invention will be described. The method for manufacturing the honeycomb structure of the present invention is a method for manufacturing the above honeycomb structure of the present invention, and the above embodiment of the honeycomb structure of the present invention can be manufactured by the embodiment of the method for manufacturing the honeycomb structure of the present invention.

First, a tubular formed honeycomb article is formed of a ceramic forming material containing a ceramic material, and comprises partition walls via which a plurality of cells constituting through channels for a fluid are partitioned and an outer peripheral wall positioned in the outermost periphery of the article.

The ceramic material contained in the ceramic forming material preferably contains at least one selected from the group consisting of a cordierite forming material, cordierite, mullite, alumina, silicon carbide and aluminum titanate, is further preferably at least one selected from the group consisting of the cordierite forming material, cordierite, mullite, alumina, silicon carbide and aluminum titanate, and is especially preferably one selected from the group consisting of the cordierite forming material, cordierite, mullite, alumina, silicon carbide and aluminum titanate. It is to be noted that the cordierite forming material is a ceramic material obtained by blending a chemical composition in a range of 42 to 56 mass % of silica, 30 to 45 mass % of alumina and 12 to 16 mass % of magnesia, and the material is fired to form cordierite.

Moreover, this ceramic forming material is preferably prepared by mixing the above ceramic material with a dispersion medium, an organic binder, an inorganic binder, a pore former, a surfactant and the like.

To form the article of the ceramic forming material, the forming material is first kneaded to obtain a kneaded clay, and the obtained kneaded clay is preferably formed into a honeycomb shape. There is not any special restriction on a method for kneading the forming material to form the kneaded clay, but examples of the method include methods in which, for example, a kneader, a vacuum clay kneader and the like are used. There is not any special restriction on a method for forming the formed honeycomb article of the kneaded clay, and a heretofore known forming method such as extrusion forming or injection forming may be used. Preferable examples of the method include a method for extrusion-forming the formed honeycomb article by use of a die having a desirable cell shape, partition wall thickness and cell density. As the material of the die, a hard alloy which does not easily wear is preferable.

Moreover, after the above forming, the resultant formed honeycomb article may be dried. There is not any special restriction on a drying method, but examples of the method include hot air drying, microwave drying, dielectric drying, reduced pressure drying, vacuum drying and freeze drying. Above all, the dielectric drying, microwave drying and hot air drying are preferably performed alone or as a combination of them. Moreover, drying conditions are preferably set to a drying temperature of 80 to 150° C. and a drying time of five minutes to two hours.

Next, the resultant formed honeycomb article is preferably fired. It is to be noted that the firing may be performed after forming the plugged portions in the formed honeycomb article.

Moreover, the formed honeycomb article is preferably calcinated before firing (finally firing) the formed honeycomb article. The calcinating is performed for degreasing, and there is not any special restriction on a calcinating method as long as a contained organic substance (the organic binder, dispersion medium, pore former or the like) can be removed. In general, the burning temperature of the organic binder is from about 100 to 300° C., and the burning temperature of the pore former is from about 200 to 800° C., whereby as calcinating conditions, the article is preferably heated in an oxidizing atmosphere at about 200 to 1000° C. for about 3 to 100 hours.

The formed honeycomb article is fired (finally fired) to sinter and densify the forming material constituting the formed and calcinated article, thereby acquiring a predetermined strength. Firing conditions (temperature, time and atmosphere) vary in accordance with the type of the forming material, and hence appropriate conditions may be selected in accordance with the type of the forming material. When, for example, the cordierite forming material is used, a firing temperature is preferably from 1410 to 1440° C. Moreover, a firing time is preferably from four to six hours.

Next, a plugging material is charged into the open frontal areas of the predetermined cells (first cells) in the end face of the formed honeycomb article on the fluid inlet side thereof, and the open frontal areas of the remaining cells (second cells) in the end face of the article on the fluid outlet side thereof, whereby the above embodiment of the honeycomb structure of the present invention is preferably obtained which has the plugged portions in the open frontal areas of the predetermined cells (the first cells) in the end face of the article on the fluid inlet side thereof and the open frontal areas of the remaining cells (the second cells) in the end face of the article on the fluid outlet side thereof.

Examples of a method for charging the plugging material into the formed honeycomb article include a method comprising a masking process of attaching a sheet to one end face of a formed honeycomb article comprising porous partition walls via which a plurality of cells constituting through channels for a fluid are partitioned and an outer peripheral wall positioned in the outermost periphery of the article, and making holes in the positions of the sheet superimposed on the cells in which plugged portions are to be formed; a first press-in process of pressing the end of the formed honeycomb article to which the sheet is attached into a container in which a plugging material is received to press the plugging material into the cells via the one end face of the formed honeycomb article through the holes formed in the sheet; a recess portion forming process of recessing the end of the plugging material charged in the formed honeycomb article on the end face side of the formed honeycomb article to form recess portions; and a second press-in process of further pressing the plugging material into the cells in which the plugging material having the formed recess portions are charged, over the plugging material having the formed recess portions.

Moreover, the second press-in process is preferably a process of moving a pressurization member having a pressurization face along the surface of the sheet in a state where the pressurization face forms an acute angle with respect to the end face of the formed honeycomb article, and pressing, by the pressurization face, the plugging material supplied between the sheet and the pressurization face into the cells in which the plugging material having the formed recess portions is charged, over the plugging material having the formed recess portions, through the holes formed in the sheet.

The above method for charging the plugging material into the formed honeycomb article will be described in more detail with reference to FIGS. 2A to 2G and FIG. 3.

Figure 2A:
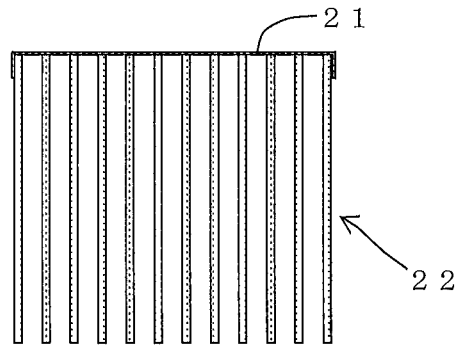
FIG. 2A is a schematic diagram showing a part of a process in one embodiment of a method for manufacturing a honeycomb structure of the present invention.
Figure 2B:
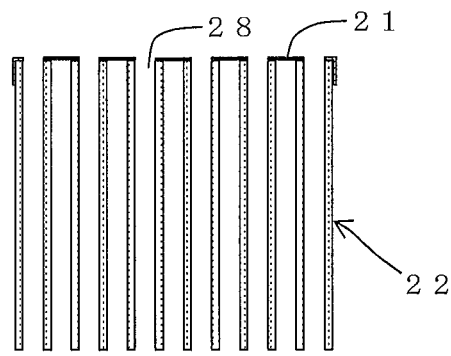
FIG. 2B is a schematic diagram showing a part of the process in the embodiment of the method for manufacturing the honeycomb structure of the present invention.

First, as shown in FIGS. 2A and 2B, a sheet 21 is attached to one end face of a formed honeycomb article 22 comprising porous partition walls via which a plurality of cells constituting through channels for a fluid are partitioned and an outer peripheral wall positioned in the outermost periphery of the article, and holes 28 are made in positions of the sheet 21 superimposed on the cells in which plugged portions are to be formed (the masking process). FIG. 2A is a schematic diagram showing a part of the process in one embodiment of the method for manufacturing a honeycomb structure of the present invention. FIG. 2B is a schematic diagram showing a part of the process in the embodiment of the method for manufacturing the honeycomb structure of the present invention.

As the material of the sheet 21, a polyester-based resin is preferable. Above all, polyethylene terephthalate (PET) is further preferable. The thickness of the sheet 21 is preferably from 30 to 70 µm.

To form the holes 28 in the sheet 21, the end face of the formed honeycomb article 22 is preferably beforehand photographed by an image pickup device to acquire image data with which the shapes and positions of the cells in which the plugged portions are to be formed and the cells in which the plugged portions are not to be formed can be specified. Moreover, holes are preferably made in 'the portions of the sheet superimposed on the cells in which the plugged portions are to be formed' based on the acquired image data by a laser. There is not any special restriction on the image pickup device, but examples of the device include a charge-coupled device (CCD) camera and a complementary metal oxide semiconductor (CMOS) sensor.

Figure 2C:
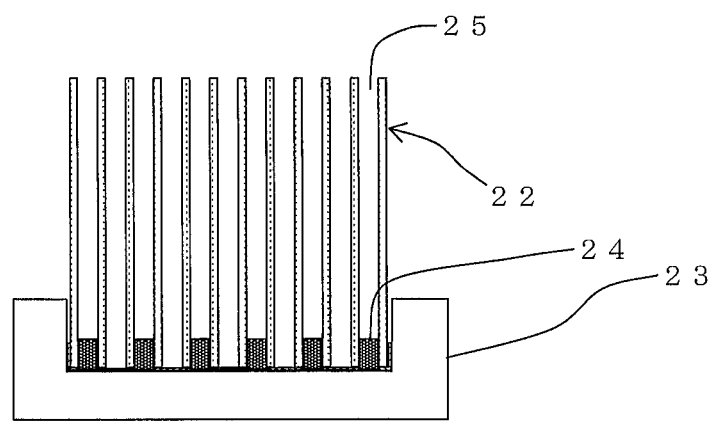
FIG. 2C is a schematic diagram showing a part of the process in the embodiment of the method for manufacturing the honeycomb structure of the present invention.
Figure 2D:
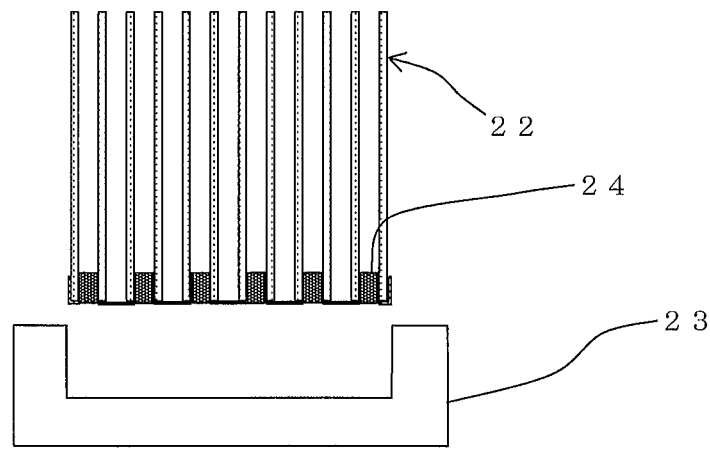
FIG. 2D is a schematic diagram showing a part of the process in the embodiment of the method for manufacturing the honeycomb structure of the present invention.

Next, as shown in FIG. 2C, the end of the formed honeycomb article 22 to which the sheet is attached is pressed into a container (a container for plugging) 23 in which a plugging material 24 is received to press the plugging material 24 into cells 25 via the one end face of the formed honeycomb article 22 through the holes formed in the sheet (the first press-in process). Moreover, after pressing the plugging material 24 into the cells 25, as shown in FIG. 2D, the formed honeycomb article is extracted from the container 23 for plugging. To press the end of the formed honeycomb article 22 into the container 23 for plugging, the end of the formed honeycomb article 22 is directed downwards in a vertical direction, and the formed honeycomb article 22 is preferably moved downwardly in the vertical direction. FIG. 2C is a schematic diagram showing a part of the process in the embodiment of the method for manufacturing the honeycomb structure of the present invention. FIG. 2D is a schematic diagram showing a part of the process in the embodiment of the method for manufacturing the honeycomb structure of the present invention.

As the plugging material, a material used as the material of the partition walls is preferably used, and the amount of water is preferably regulated so that the viscosity of the material at 25° C. is from 100 to 300 dPa·s.

Figure 4A:
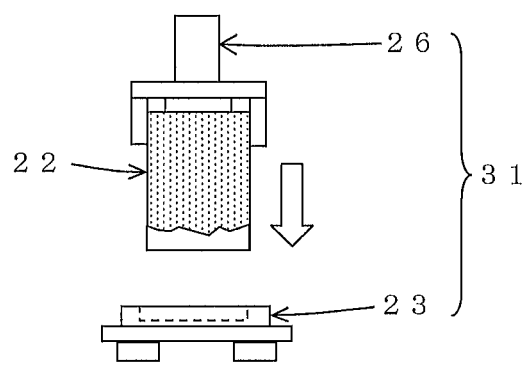
FIG. 4A is a side view schematically showing a first press-in device in one embodiment of a manufacturing apparatus of a honeycomb structure of the present invention.
Figure 4B:
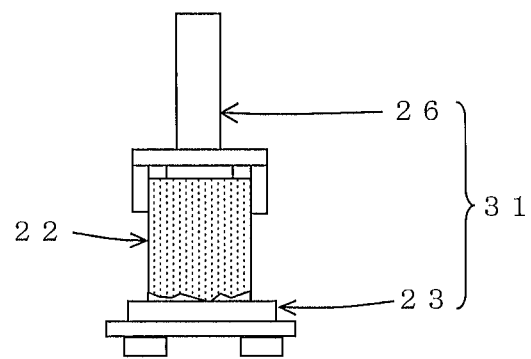
FIG. 4B is a side view schematically showing the first press-in device in the embodiment of the manufacturing apparatus of the honeycomb structure of the present invention.

In the first press-in process, as shown in FIGS. 4A and 4B, it is preferable to use a first press-in device 31 comprising the container 23 for plugging in which the plugging material is received, and press-in means 26 for pressing, into the container 23 for plugging in which the plugging material is received, the end of the formed honeycomb article 22 including the porous partition walls via which a plurality of cells constituting the through channels for the fluid are partitioned and the outer peripheral wall positioned in the outermost periphery of the article, to charge the plugging material into the cells through the end face of the formed honeycomb article 22. FIG. 4A is a side view schematically showing the first press-in device 31 in one embodiment of a manufacturing apparatus of a honeycomb structure of the present invention. FIG. 4B is a side view schematically showing the first press-in device 31 in the embodiment of the manufacturing apparatus of the honeycomb structure of the present invention.

There is not any special restriction on the container 23 for plugging, in which the plugging material is received, as long as the one end of the formed honeycomb article can be inserted into the container 23 for plugging, to charge, into the cells, the plugging material received in the container 23 for plugging. There is not any special restriction on the material of the container 23 for plugging, but stainless steel or the like may be used. Moreover, the thickness of the container 23 for plugging is preferably from 20 to 40 mm, and the inner diameter of the container 23 for plugging is preferably from 101 to 105% of the diameter of the end face of the formed honeycomb article.

The press-in means 26 preferably includes a grasping portion which grasps the formed honeycomb article, and a pressurization mechanism which moves the formed honeycomb article upwards and downwards in the vertical direction in a state where the article is grasped. Subsequently, the formed honeycomb article is preferably pressed into the container 23 for plugging, by use of the pressurization mechanism. There is not any special restriction on the grasping portion, but examples of the grasping portion include a grasping portion including two plates having mutually facing surfaces which are provided with an elastic material such as rubber so that the elastic material can come in contact with the formed honeycomb article to sandwich the formed honeycomb article between the two plates. Moreover, examples of the pressurization mechanism include a mechanism which moves the grasping portion upwards and downwards by a motor or the like.

Furthermore, the first press-in device 31 may have a constitution in which the formed honeycomb article is fixed by the press-in means 26, and the container 23 for plugging is moved upwards and downwards in the vertical direction. In this case, the container 23 for plugging is preferably disposed on a table, and the table is moved upwards and downwards in the vertical direction by the motor.

Figure 2E:
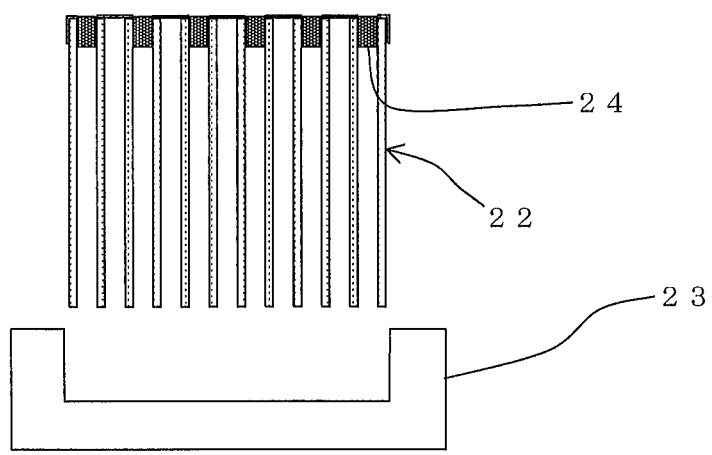
FIG. 2E is a schematic diagram showing a part of the process in the embodiment of the method for manufacturing the honeycomb structure of the present invention.
Figure 2F:
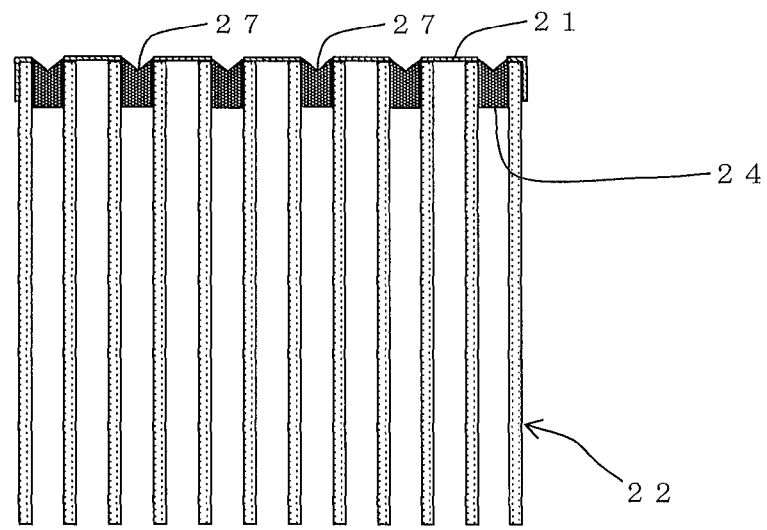
FIG. 2F is a schematic diagram showing a part of the process in the embodiment of the method for manufacturing the honeycomb structure of the present invention.

Next, as shown in FIG. 2F, the end of the plugging material 24 charged in the formed honeycomb article 22 on the end face side of the formed honeycomb article 22 is recessed to form recess portions 27 (a recess portion forming process). FIG. 2F is a schematic diagram showing a part of the process in the embodiment of the method for manufacturing the honeycomb structure of the present invention.

In the recess portion forming process, after extracting the formed honeycomb article 22 from the container 23 for plugging, as shown in FIG. 2E, the formed honeycomb article 22 is inverted so as to direct the end (the end face) of the article having the formed plugged portions 24 upwardly in the vertical direction. Subsequently, as shown in FIG. 2F, the formed honeycomb article 22 is left to stand in a state where the end (the end face) of the article having the formed plugged portions 24 is directed upwardly in the vertical direction, thereby forming the recess portions 27 by a gravity. The leaving time is preferably from 20 to 60 seconds, when the viscosity of the plugging material at 25° C. is from 100 to 300 dPa·s. FIG. 2E is a schematic diagram showing a part of the process in the embodiment of the method for manufacturing the honeycomb structure of the present invention.

Figure 5:
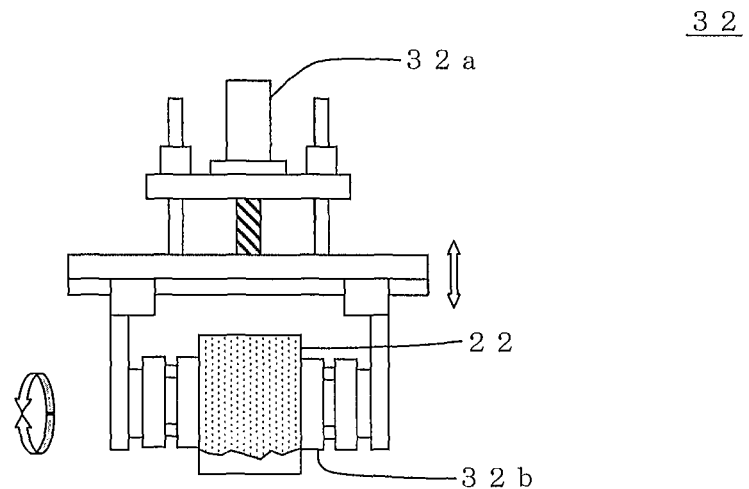
FIG. 5 is a side view schematically showing a device for inverting a formed honeycomb article (an inverting device) in the embodiment of the manufacturing apparatus of the honeycomb structure of the present invention.

When the formed honeycomb article is inverted, an inverting device 32 shown in FIG. 5 is preferably used. The inverting device 32 preferably comprises an inverting mechanism 32b which grasps and inverts the formed honeycomb article 22 and an elevating mechanism 32a which moves the inverting mechanism 32b grasping the formed honeycomb article 22 upwards and downwards. The elevating mechanism 32a and the inverting mechanism 32b are preferably driven by the motor or the like. FIG. 5 is a side view schematically showing the inverting device which inverts the formed honeycomb article in the embodiment of the manufacturing apparatus of the honeycomb structure of the present invention. Here, the process of forming the recess portions may be performed for a time required from the inverting process after the first press-in process until the next process which is a second press-in process. That is, the article does not have to be left to stand, and a time necessary for forming the recess portions may be provided in the flow of a manufacturing line.

The recess depths of the recess portions 27 are preferably from 0.5 to 2 mm. When the depths are smaller than 0.5 mm, the bubbles are not easily formed in the plugged portions sometimes. When they are larger than 2 mm, the bubbles formed in the plugged portions become excessively large sometimes. Each of 'the recess depths of the recess portions 27' is a distance from the tip of the recess portion 27 on the side of the end face of the formed honeycomb article to the deepest position of the recess portion (a distance along the central axis direction of the plugged portion).

Moreover, examples of the method for forming the recess portions in the plugging material include a method which uses a jig inserted into the open frontal areas of the cells to form the recesses in the plugging material.

Figure 2G:
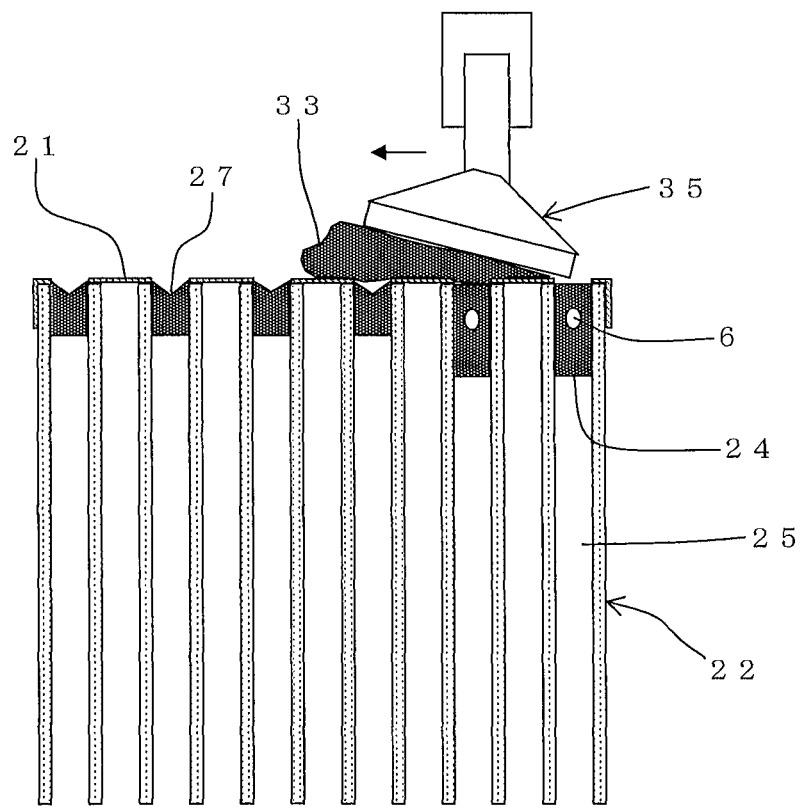
FIG. 2G is a schematic diagram showing a part of the process in the embodiment of the method for manufacturing the honeycomb structure of the present invention.

Next, as shown in FIG. 2G, a plugging material (a plugging material 33 before charging) is further pressed into the cells 25 in which 'the plugging material 24 having the formed recess portions 27' is charged, over the plugging material 24 in which the recess portions 27 are formed (the second press-in process). FIG. 2G is a schematic diagram showing a part of the process in the embodiment of the method for manufacturing the honeycomb structure of the present invention.

Figure 6:
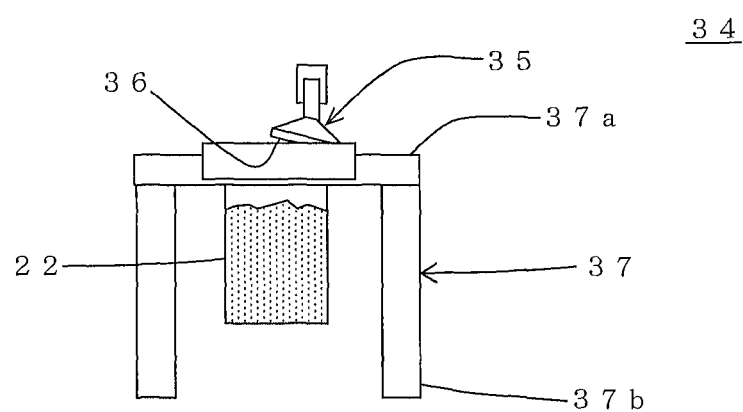
FIG. 6 is a side view schematically showing a second press-in device in the embodiment of the manufacturing apparatus of the honeycomb structure of the present invention.

In the second press-in process, a second press-in device 34 shown in FIG. 6 is preferably used which comprises a pressurization member 35 having a pressurization face 36, and further presses, by the pressurization member 35, the plugging material into the cells over the plugging material charged in the cells of the formed honeycomb article 22. It is to be noted that the second press-in process may be performed manually by use of a squeegee or the like instead of the second press-in device 34. FIG. 6 is a side view schematically showing the second press-in device in the embodiment of the manufacturing apparatus of the honeycomb structure of the present invention.

There is not any special restriction on the shape of the pressurization face 36 constituting the pressurization member 35, but examples of the shape include a rectangular shape and a circular shape. The pressurization face 36 preferably has such a size that when the pressurization face is moved along the end face of the formed honeycomb article, the face moves over the whole end face of the formed honeycomb article (the upside of the vertical direction). The material of the pressurization member 35 is preferably aluminum, stainless steel or the like. The material of the pressurization face 36 of the pressurization member 35 is preferably elastomer such as rubber. Therefore, the pressurization member 35 is preferably a member obtained by attaching a pressurization face forming material of rubber or the like to a pressurization member main body made of stainless steel or the like.

Moreover, the pressurization member 35 is preferably moved by a pressurization mechanism for moving the pressurization face 36 in a direction perpendicular to the end face of the formed honeycomb article (upwards and downwards in the vertical direction), and a driving mechanism for moving the pressurization face 36 along the end face of the formed honeycomb article (the surface of the sheet). The pressurization mechanism is preferably a mechanism for moving the pressurization member upwards and downwards in the vertical direction by an air pressure, an oil pressure or the like. The driving mechanism is preferably a mechanism for moving the pressurization member in a horizontal direction by the motor or the like.

As shown in FIG. 6, the second press-in device 34 preferably comprises a fixing table 37 for fixing the formed honeycomb article 22. The fixing table 37 shown in FIG. 6 includes a table portion 37a and a leg portion 37b. In the table portion 37a, there is preferably formed a hole into which the end of the formed honeycomb article can be inserted. Moreover, the formed honeycomb article is preferably inserted into the hole, and fixed in a state where the end face of the formed honeycomb article is positioned on the same plane as the upper surface of the table portion 37a (the surface directed upwardly in the vertical direction), and the plugging material is preferably charged into the cells in this state.

When the second press-in process is performed using the second press-in device 34, the formed honeycomb article having the one end face side in which the plugging material is charged is fixed to the fixing table 37 so as to fix the one end face side thereof to the table portion 37a. Afterward, the pressurization member 35 having the pressurization face 36 is moved along the surface of the sheet in a state where the pressurization face 36 forms an acute angle with respect to the end face of the formed honeycomb article 22, and the plugging material supplied between the sheet and the pressurization face 36 is preferably pressed into the cells in which the plugging material having the formed recess portions is charged, over 'the plugging material having the formed recess portions', through the holes formed in the sheet.

Figure 3:
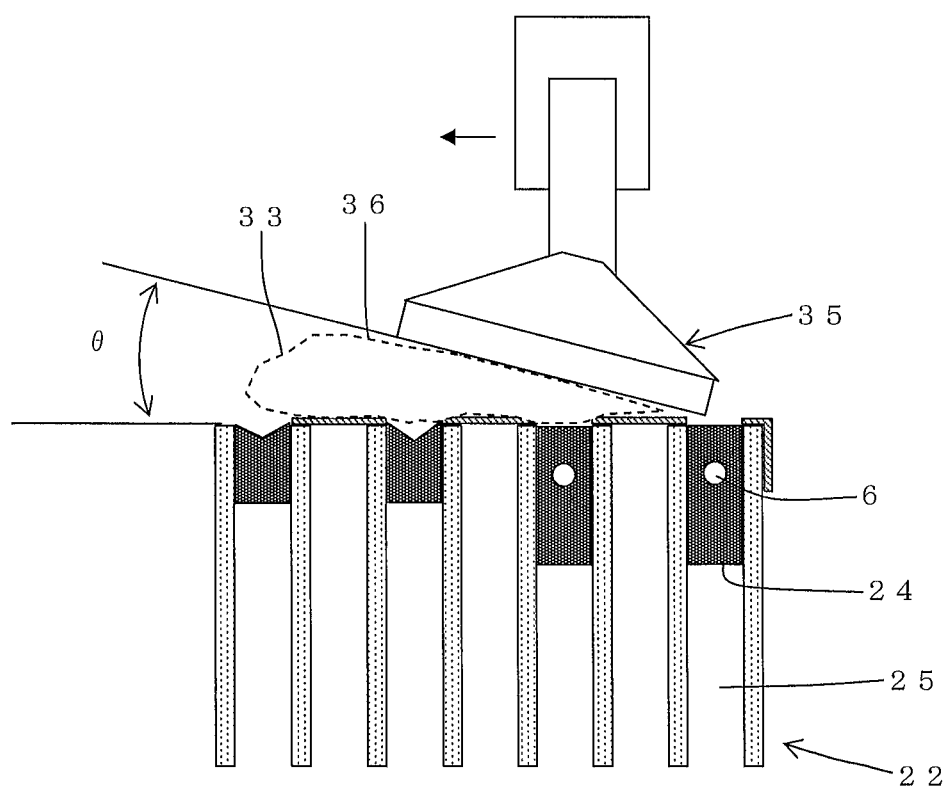
FIG. 3 is a schematic diagram showing a part of the process in the embodiment of the method for manufacturing the honeycomb structure of the present invention.

As shown in FIG. 3, an angle $\theta$ between the pressurization face 36 of the pressurization member 35 and the end face of the formed honeycomb article 22 (the surface of the sheet) is an acute angle, i.e., preferably from 5 to 70°. When the angle is smaller than 5° or larger than 70°, the plugging material cannot easily be charged sometimes. Moreover, when the bubbles are to be positioned close to the end face of the formed honeycomb article, the angle $\theta$ is preferably increased to preferably specifically 40 to 70°. Moreover, when the bubbles are arranged away from the end face of the formed honeycomb article, the angle $\theta$ is preferably decreased to preferably specifically 5 to 40°. FIG. 3 is a schematic diagram showing a part of the process in the embodiment of the method for manufacturing the honeycomb structure of the present invention.

When the plugging material is charged by the pressurization member 35, a pressure to press the end face of the formed honeycomb article (directed downwardly in the vertical direction) is preferably from 0.2 to 0.5 MPa, further preferably from 0.3 to 0.5 MPa. When the pressure is smaller than 0.2 MPa, the plugging material is not easily charged sometimes. When it is larger than 0.5 MPa, the end of the formed honeycomb article is easily damaged sometimes.

When the pressurization member 35 is moved along the end face of the formed honeycomb article 22 (the surface of the sheet), a moving speed is preferably from 100 to 400 mm/second. When the speed is lower than 100 mm/second, the amount of the plugging material to be supplied decreases, and a recessed shape is easily left in the surface of the structure, which deteriorates the production efficiency of the honeycomb structure sometimes. When the speed is higher than 400 mm/second, the plugging material is not easily uniformly charged into the cells of the honeycomb structure sometimes.

The plugging material used in the second press-in process is preferably the same as the plugging material used in the first press-in process.

Figure 7:
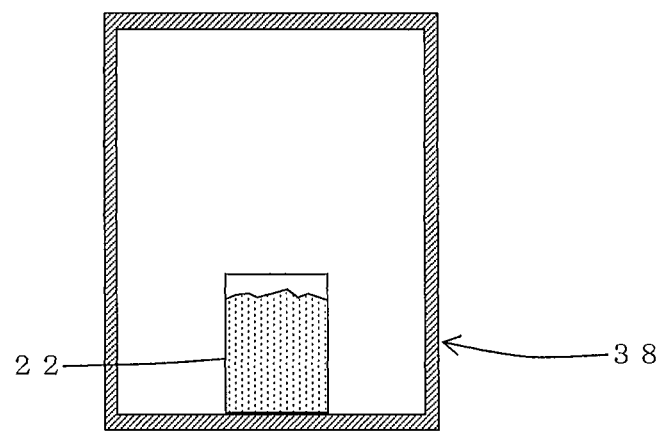
FIG. 7 is a schematic diagram showing the cross section of a drying device in the embodiment of the manufacturing apparatus of the honeycomb structure of the present invention.

Next, the plugging material charged in the formed honeycomb article is preferably dried to form the plugged portions (a drying process). In the drying process, a drying device 38 shown in FIG. 7 is preferably used. FIG. 7 is a schematic diagram showing the cross section of the drying device 38 in the embodiment of the manufacturing apparatus of the honeycomb structure of the present invention.

Examples of the drying device include a hot air drying device, a hot plate and a far infrared drier. A drying temperature is preferably from 150 to 200° C. A drying time is preferably from one to three minutes.

In the method for manufacturing the honeycomb structure of the present invention, after forming the plugged portions in the predetermined cells of one end face of the formed honeycomb article, the plugged portions are preferably formed in the remaining cells of the other end face of the article by the same method, to obtain the honeycomb structure of the present invention.

EXAMPLES

Hereinafter, the present invention will further specifically be described with respect to examples, but the present invention is not limited to these examples.

Example 1

A plurality of components selected from the group consisting of talc, kaolin, calcinated kaolin, alumina, aluminum hydroxide and silica were combined to prepare a cordierite forming material at a predetermined ratio so that a chemical composition of the material contained 42 to 56 mass % of $SiO_2$, 30 to 45 mass % of $Al_2O_3$ and 12 to 16 mass % of MgO. To 100 parts by mass of the cordierite forming material, as a pore former, 10 to 20 parts by mass of graphite was added. Furthermore, appropriate amounts of methyl celluloses and a surfactant were added thereto, respectively, to prepare a kneaded clay. The prepared kneaded clay was evacuated, and extruded to obtain a formed honeycomb article comprising partition walls via which a plurality of cells were partitioned and an outer peripheral wall.

Next, the resultant formed honeycomb article was dried at 180° C. for three minutes, and fired at 1420° C. for five hours. The resultant formed honeycomb article had a partition wall thickness of 1 mm, a cell density of 300 cells/inch$^2$ (46.5 cells/cm$^2$), a porosity (a partition wall porosity) of 45% and an average pore diameter (a partition wall average pore diameter) of 25 μm. The porosity and average pore diameter were measured with a mercury porosimeter.

Next, plugged portions were formed in the resultant formed honeycomb article to form checkered patterns in both the end faces, thereby obtaining a honeycomb structure. The plugged portions were formed appropriately using devices (a first press-in device 31, a second press-in device 34, an inverting device 32 and a drying device 38) shown in FIGS. 4A to 7. The first press-in device 31 has a holding portion capable of holding and transferring the formed honeycomb article, a plugging material supply mechanism and a pressurization mechanism. The device holds the formed honeycomb article while the press-in face of the article is disposed on the downside. After supplying the desirable amount of the plugging material to a container 23, the device pressurizes the end face of the formed honeycomb article opposite to the press-in face thereof to press the plugging material into the article. The inverting device 32 has a holding portion capable of holding and transferring the formed honeycomb article, a rotation mechanism and a driving mechanism. In the second press-in device, the press-in face of the article needs to be disposed on the upside in a vertical direction, and hence the inverting device removes the formed honeycomb article from the container 23, and rotates the formed honeycomb article to direct the press-in face of the article upwardly in the vertical direction. Moreover, by the driving mechanism, the formed honeycomb article can be installed in a conveyance mechanism of the second press-in device. The second press-in device 34 comprises a positioning mechanism for positioning and holding the formed honeycomb article in a desirable position, a supply mechanism for supplying the desirable amount of the plugging material, a pressurization member, a driving mechanism for the pressurization member, and a conveyance mechanism, and the device presses the plugging material into the formed honeycomb article by a pressurization member 35, thereby forming the plugged portions. The drying device 38 has a conveyance mechanism and a chamber portion, and performs drying in a state where at least the plugged portions of the formed honeycomb article are included in a chamber. The drying device shown in FIG. 7 shows the only chamber portion. A plurality of chamber portions may be disposed.

To form the plugged portions, first, a sheet was attached to one end face of the formed honeycomb article, and holes were made in positions of the sheet superimposed on the cells in which the plugged portions were to be formed (a masking process). The material of the sheet was PET, and the thickness thereof was 25 μm. The holes were made in the sheet by a laser.

Next, the end of the formed honeycomb article to which the sheet was attached was pressed into a container for plugging, in which a plugging material was received, to press the plugging material into cells via the one end face of the formed honeycomb article through the holes formed in the sheet (a first press-in process). As the plugging material, 40 mass % of kaolin having an average particle diameter of 5 μm, 40 mass % of talc having an average particle diameter of 40 μm, 15 mass % of aluminum oxide having an average particle diameter of 10 μm and 5 mass % of silica having an average particle diameter of 5 μm were used as main inorganic components. The viscosity of the plugging material was 250 dPa·s at 25° C.

Next, the end of the plugging material charged in the formed honeycomb article on the end face side of the formed honeycomb article was recessed to form recess portions (a recess portion forming process). In the recess portion forming process, after extracting the formed honeycomb article from the container for plugging, as shown in FIG. 2E, the formed honeycomb article 22 was inverted so as to direct the end (the end face) of the article having the formed plugged portions 24 upwardly in the vertical direction. Then, as shown in FIG. 2F, in a state where the end (the end face) of the formed honeycomb article 22 having the formed plugged portions 24 was directed upwardly in the vertical direction, the article was left to stand, thereby forming recess portions 27 by a gravity. A leaving time was one minute.

Next, the plugging material was further pressed into the cells in which 'the plugging material having the formed recess portions' was charged, over 'the plugging material having the formed recess portions' (a second press-in process). The second press-in process was performed using the second press-in device 34 shown in FIG. 6. The formed honeycomb article having the one end face side in which the plugging material was charged was fixed to a fixing table 37 so as to fix the one end face side thereof to a table portion 37a. Afterward, a pressurization member 35 having a pressurization face 36 was moved along the surface of the sheet in a state where the pressurization face 36 formed an acute angle with respect to the end face of the formed honeycomb article 22, and the plugging material supplied between the sheet and the pressurization face 36 was preferably pressed by the pressurization face 36 into the cells in which the plugging material having the formed recess portions was charged, over 'the plugging material having the formed recess portions', through the holes formed in the sheet. An angle θ between 'the pressurization face of the pressurization member' and the end face of the formed honeycomb article (the surface of the sheet) was set to 20°. Moreover, when the pressurization member was moved along the surface of the sheet, the member was moved while pressing the end face of the formed honeycomb article by the pressurization face. A pressure at this time (the pressure) was set to 0.4 MPa.

Next, the plugged portions were dried using the drying device to obtain the honeycomb structure. As the drying device, a hot air drier was used. The drying temperature was set to 180° C., and the drying time was set to three minutes. The depth of each plugged portion along the central axis direction thereof (the plugged portion depth) was 9 mm.

With respect to the obtained honeycomb structure, 'the average of the center positions of bubbles (the bubble depth average)', 'the region of the center positions of the bubbles (the bubble depth range)' and 'the average diameter of the bubbles' were obtained by the following method.

(Average of Center Positions of Bubbles)

Each plugged portion is cut along 'the plane of the plugged portion including the central axis thereof', to measure a distance (the bubble depth) from the end of the plugged portion 'on the end face side of the formed honeycomb article' to the center of the bubble in the cross section of the plugged portion. Then, the value of the ratio of the bubble depth with respect to the depth of the plugged portion along the central axis direction is obtained. Thus, the average of the measured values of 100 plugged portions is obtained as 'the average of the center positions of the bubbles (the bubble depth average)'.

(Region of Center Positions of Bubbles)

Each plugged portion is cut along 'the plane of the plugged portion including the central axis thereof', to measure a distance (the bubble depth) from the end of the plugged portion 'on the end face side of the formed honeycomb article' to the center of the bubble in the cross section of the plugged portion. Subsequently, the value of the ratio of the bubble depth with respect to the depth of the plugged portion along the central axis direction is obtained. Then, the upper limit value and lower limit value of the measured values of 100 plugged portions are obtained as 'the region of the center positions of the bubbles (the bubble depth range)'. The bubble depth range is represented by a range 'from the lower limit value to the upper limit value'.

(Average Diameter of Bubbles)

Each plugged portion is cut along 'the plane of the plugged portion including the central axis thereof', to measure the maximum diameter of the bubbles in the cross sections of the plugged portions, whereby the measured values of the bubbles formed in 100 plugged portions are averaged. When a plurality of bubbles are formed in one plugged portion, the values of all the bubbles are averaged. The diameter of each bubble is a value measured in a state where the bubble is enlarged twice in an optical microscope.

TABLE 1

|  | Angle θ | Pressure (MPa) | Bubble depth ave. (mm) | Plugged portion depth (mm) | Bubble depth range (mm) | Bubble ave. dia. (mm) |
| --- | --- | --- | --- | --- | --- | --- |
| Ex. 1 | 20 | 0.1 | 1.6 | 9.0 | 1.1 to 1.9 | 0.5 |
| Ex. 2 | 20 | 0.2 | 1.8 | 9.0 | 1.6 to 2.2 | 0.6 |
| Ex. 3 | 20 | 0.3 | 3.5 | 9.0 | 3.3 to 3.8 | 1.0 |
| Ex. 4 | 10 | 0.4 | 4.1 | 9.0 | 3.9 to 4.5 | 1.5 |
| Ex. 5 | 20 | 0.4 | 3.4 | 9.0 | 3.2 to 4.9 | 1.7 |
| Ex. 6 | 30 | 0.4 | 3.0 | 9.0 | 1.7 to 4.8 | 1.6 |

Examples 2 to 6

Honeycomb structures were prepared in the same manner as in Example 1 except that an angle θ, a pressure by a pressurization face and a plugging depth were changed as shown in Table 1. In the same manner as in Example 1, 'the average of the center positions of bubbles (the bubble depth average)', 'the region of the center positions of the bubbles (the bubble depth range)' and 'the average diameter of the bubbles' were obtained. Results are shown in Table 1.

It is seen from Examples 1 to 3 of Table 1 that when the pressure by the pressurization face is increased, the bubble depths increase, and the average diameter of the bubbles increases. Moreover, it is seen from Examples 4 to 6 of Table 1 that when the angle θ increases, the bubble depths decrease.

The honeycomb structure of the present invention is suitably utilized for the disposal of fine particles or harmful substances in an exhaust gas from an internal combustion engine, a boiler or the like. In addition, the honeycomb structure can also be applied to a device for removing harmful substances from a device which discharges a large amount of soot and smoke.

DESCRIPTION OF REFERENCE NUMERALS

2: cell, 3: partition wall, 4: outer peripheral wall, 5: plugged portion, 6: bubble, 7: end of plugged portion on end face side, 8: predetermined region of plugged portion in central axis direction thereof, 11: end face on inlet side, 12: end face on outlet side, 21: sheet, 22: formed honeycomb article, 23: container (container for plugging), 24: plugging material, 25: cell, 26: press-in means, 27: recess portion, 28: hole, 31: first press-in device, 32: inverting device, 32a: elevating mechanism, 32b: inverting mechanism, 33: plugging material before charging, 34: second press-in device, 35: pressurization member, 36: pressurization face, 37: fixing table, 37a: table portion, 37b: leg portion, 38: drying device, and 100, 200: honeycomb structure

What is claimed is:

1. A honeycomb structure comprising: porous partition walls via which a plurality of cells constituting through channels for a fluid are partitioned; and an outer peripheral wall positioned in the outermost periphery of the structure, open frontal areas of predetermined cells in an end face of the structure on a fluid inlet side thereof and open frontal areas of remaining cells in an end face of the structure on a fluid outlet side thereof being provided with plugged portions, wherein each of the plugged portions having bubbles formed therein has one or two bubbles formed in the plugged portion, and each of the bubbles is positioned only in a predetermined region in the center region of the plugged portion in a cross-section perpendicular to a direction in which the plurality of cells extend, wherein the predetermined region of the plugged portion along the central axis direction thereof where the bubble is positioned is a region between the position of ⅓ of the depth of the plugged portion from the end of the plugged portion on the end face side thereof and the position of ½ of the depth of the plugged portion from the end of the plugged portion on the end face side thereof, and wherein each of the bubbles formed in the plugged portions has a diameter of 0.3 mm or more.

2. The honeycomb structure according to claim 1, wherein the plugged portions of 70% or more of all the plugged portions have the bubbles.

3. The honeycomb structure according to claim 1, wherein the depths of the plugged portions are from 3 to 12 mm.

4. The honeycomb structure according to claim 1, wherein the predetermined cells and the remaining cells are alternately arranged.

5. The honeycomb structure according to claim 1, wherein the material of the partition walls and the plugged portions contains at least one selected from the group consisting of cordierite, mullite, alumina, silicon carbide and aluminum titanate.

6. A method for manufacturing a honeycomb structure, comprising:

a masking process of attaching a sheet to one end face of a formed honeycomb article comprising porous partition walls via which a plurality of cells constituting through channels for a fluid are partitioned and an outer peripheral wall positioned in the outermost periphery of the article, and making holes in the positions of the sheet superimposed on the cells in which plugged portions are to be formed;

a first press-in process of pressing the end of the formed honeycomb article, to which the sheet is attached, into a container in which a plugging material is received, to press the plugging material into the cells via the one end face of the formed honeycomb article through the holes formed in the sheet;

a recess portion forming process of recessing the end of the plugging material charged in the formed honeycomb article on the end face side of the formed honeycomb article to form recess portions in the plugging material of each plugged portion having bubbles formed therein; and a second press-in process of further pressing the plugging material into the cells in which the plugging material having the formed recess portions, over the plugging material having the formed recess portions in the plugging material of each plugged portion having bubbles formed therein, wherein each of the plugged portions having bubbles formed therein has one or two bubbles formed in the plugged portion, and each of the bubbles is positioned only in a predetermined region in the center region of the plugged portion in a cross section perpendicular to a direction in which the plurality of cells extend, wherein the predetermined region of the plugged portion along the central axis direction thereof where the bubble is positioned is a region between the position of ⅓ of the depth of the plugged portion from the end of the plugged portion on the end face side thereof and the position of ½ of the depth of the plugged portion from the end of the plugged portion on the end face side thereof, and wherein each of the bubbles formed in the plugged portions has a diameter of 0.3 mm or more.

7. The method for manufacturing the honeycomb structure according to claim 6, wherein the second press-in process is a process of moving a pressurization member having a pressurization face along the surface of the sheet in a state where the pressurization face forms an acute angle with respect to the end face of the formed honeycomb article, and pressing, by the pressurization face, the plugging material supplied between the sheet and the pressurization face into the cells in which the plugging material having the formed recess portions is charged, over the plugging material having the formed recess portions, through the holes formed in the sheet.

8. A manufacturing apparatus of a honeycomb structure, comprising:

a first press-in device including a container for plugging in which a plugging material is received, and press-in means for pressing, into the container for plugging in which the plugging material is received, the end of a formed honeycomb article including porous partition walls via which a plurality of cells constituting through channels for a fluid are partitioned and an outer peripheral wall positioned in the outermost periphery of the article, to charge the plugging material into the cells through the end face of the formed honeycomb article;

a second press-in device including a pressurization member having a pressurization face to further press, by the pressurization member, the plugging material into the cells over the plugging material charged in the cells of the formed honeycomb article; and a drying device which dries the plugging material charged in the formed honeycomb article, wherein each of the plugged portions having bubbles formed therein has one or two bubbles formed in the plugged portion, and each of the bubbles is positioned only in a predetermined region in the center region of the plugged portion in a cross section perpendicular to a direction in which the plurality of cells extend, wherein the predetermined region of the plugged portion along the central axis direction thereof where the bubble is positioned is a region between the position of ⅓ of the depth of the plugged portion from the end of the plugged portion on the end face side thereof and the position of ½ of the depth of the plugged portion from the end of the plugged portion on the end face side thereof, and wherein each of the bubbles formed in the plugged portions has a diameter of 0.3 mm or more.

* * * * *